US008848410B2

(12) United States Patent
Uchino et al.

(10) Patent No.: US 8,848,410 B2
(45) Date of Patent: Sep. 30, 2014

(54) MATRIX CONVERTER

(71) Applicant: Kabushiki Kaisha Yaskawa Denki, Kitakyushu (JP)

(72) Inventors: Takahiro Uchino, Fukuoka (JP); Ryo Ohira, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 14/058,301

(22) Filed: Oct. 21, 2013

(65) Prior Publication Data

US 2014/0159698 A1   Jun. 12, 2014

Related U.S. Application Data

(60) Provisional application No. 61/734,332, filed on Dec. 6, 2012.

(51) Int. Cl.
*H02M 5/00*     (2006.01)
*H02M 5/275*   (2006.01)
*H02M 5/293*   (2006.01)

(52) U.S. Cl.
USPC .......................................... 363/159; 363/163

(58) Field of Classification Search
USPC ................................. 363/159, 163
See application file for complete search history.

(56) References Cited

U.S. PATENT DOCUMENTS

| | | | |
|---|---|---|---|
| 5,852,559 A * | 12/1998 | Li ................................... | 363/163 |
| 5,949,672 A * | 9/1999 | Bernet .......................... | 363/159 |
| 6,137,703 A | 10/2000 | Julian et al. | |
| 6,771,524 B2 * | 8/2004 | Miguchi ........................ | 363/159 |
| 7,626,840 B2 * | 12/2009 | Ueda ............................. | 363/163 |
| 8,045,354 B2 * | 10/2011 | Lacaze .......................... | 363/163 |
| 8,080,958 B2 * | 12/2011 | Yamanaka .................... | 318/459 |
| 2003/0112640 A1 * | 6/2003 | Briesen et al. ................. | 363/13 |
| 2004/0027843 A1 * | 2/2004 | Mahlein et al. ............... | 363/159 |
| 2011/0116295 A1 * | 5/2011 | Ueda et al. .................... | 363/163 |

FOREIGN PATENT DOCUMENTS

| | | |
|---|---|---|
| JP | 11-262264 | 9/1999 |
| JP | 2003-333826 | 11/2003 |

\* cited by examiner

*Primary Examiner* — Jue Zhang

(74) *Attorney, Agent, or Firm* — Mori & Ward, LLP

(57) ABSTRACT

A matrix converter includes input terminals, output terminals, a power conversion circuit, and a snubber circuit. The power conversion circuit includes bidirectional switches of which each includes antiparallel connection circuits connected serially. The snubber circuit is connected to the bidirectional switches. The snubber circuit includes first diodes, a capacitor, a second diode, and third diodes. The first diodes are respectively corresponded to the bidirectional switches. A first connecting point of each the first diode is connected to a connection point between the two unidirectional switching elements constituting the bidirectional switch. A first connecting point of the capacitor is connected to a second connecting point of each the first diode. First and second connecting points of the second diode are connected to a second connecting point of the capacitor and the corresponding output terminal. The bidirectional switches, the first diodes, and the second diode are arranged in one power module.

14 Claims, 12 Drawing Sheets

MATRIX CONVERTER

CROSS-REFERENCE TO RELATED APPLICATION

This application is based upon and claims the benefit of priority of the Provisional Application No. 61/734,332, filed on Dec. 6, 2012, the entire contents of which are incorporated herein by reference.

FIELD

The embodiments discussed herein are directed to a matrix converter.

BACKGROUND

A matrix converter is capable of suppressing a harmonic current and effectively using regenerative power and hence, the matrix converter has received attention as a new power converter. The matrix converter includes, in some cases, a plurality of bidirectional switches for connecting each phase line of an alternating current source and each phase line of a dynamo-electric machine to perform power conversion by controlling the bidirectional switches.

Furthermore, the matrix converter includes, in some cases, a snubber circuit for ensuring the commutation passage (conduction passage bypassing the bidirectional switch) of a current having flowed immediately before the bidirectional switch is switched over from the ON-state to the OFF-state.

For example, Japanese Patent Application Laid-open No. H11-262264 discloses a matrix converter in which a snubber circuit is provided to each of a plurality of bidirectional switches. However, the conventional matrix converter has room for improvement with respect to the optimization of the snubber circuit.

SUMMARY

A matrix converter according to one aspect of an embodiment includes a plurality of input terminals, a plurality of output terminals, a power conversion circuit, and a snubber circuit. The power conversion circuit includes bidirectional switches of which each includes antiparallel connection circuits that are serially connected to each other. Each of the antiparallel connection circuits includes a unidirectional switching element and a diode. The bidirectional switches are arranged between the input terminals and the corresponding output terminal. The snubber circuit is connected to the bidirectional switches. The snubber circuit includes a plurality of first diodes, a capacitor, a second diode, and a plurality of third diodes. The first diodes are respectively corresponded to the bidirectional switches. A first connecting point of each of the first diodes is connected to a point of connection between the two unidirectional switching elements constituting the bidirectional switch. A first connecting point of the capacitor is connected to a second connecting point of each of the first diodes. A first connecting point of the second diode is connected to a second connecting point of the capacitor and a second connecting point of the second diode is connected to the corresponding output terminal. The third diodes are respectively corresponded to the bidirectional switches. A first connecting point of each of the third diodes is connected to the second connecting point of the capacitor. A second connecting point of each of the third diodes is connected to the corresponding input terminal. Furthermore, the bidirectional switches connected between at least one of the output terminals and each of the input terminals, the first diodes connected to the respective bidirectional switches, and the second diode are arranged in one power module. The power module is provided for the corresponding output terminal.

DESCRIPTION OF EMBODIMENTS

With reference to the accompanying drawings, the following describes embodiments of a matrix converter disclosed in the present application in detail. Here, the present application is not limited to these embodiments.

First Embodiment

Figure 1:
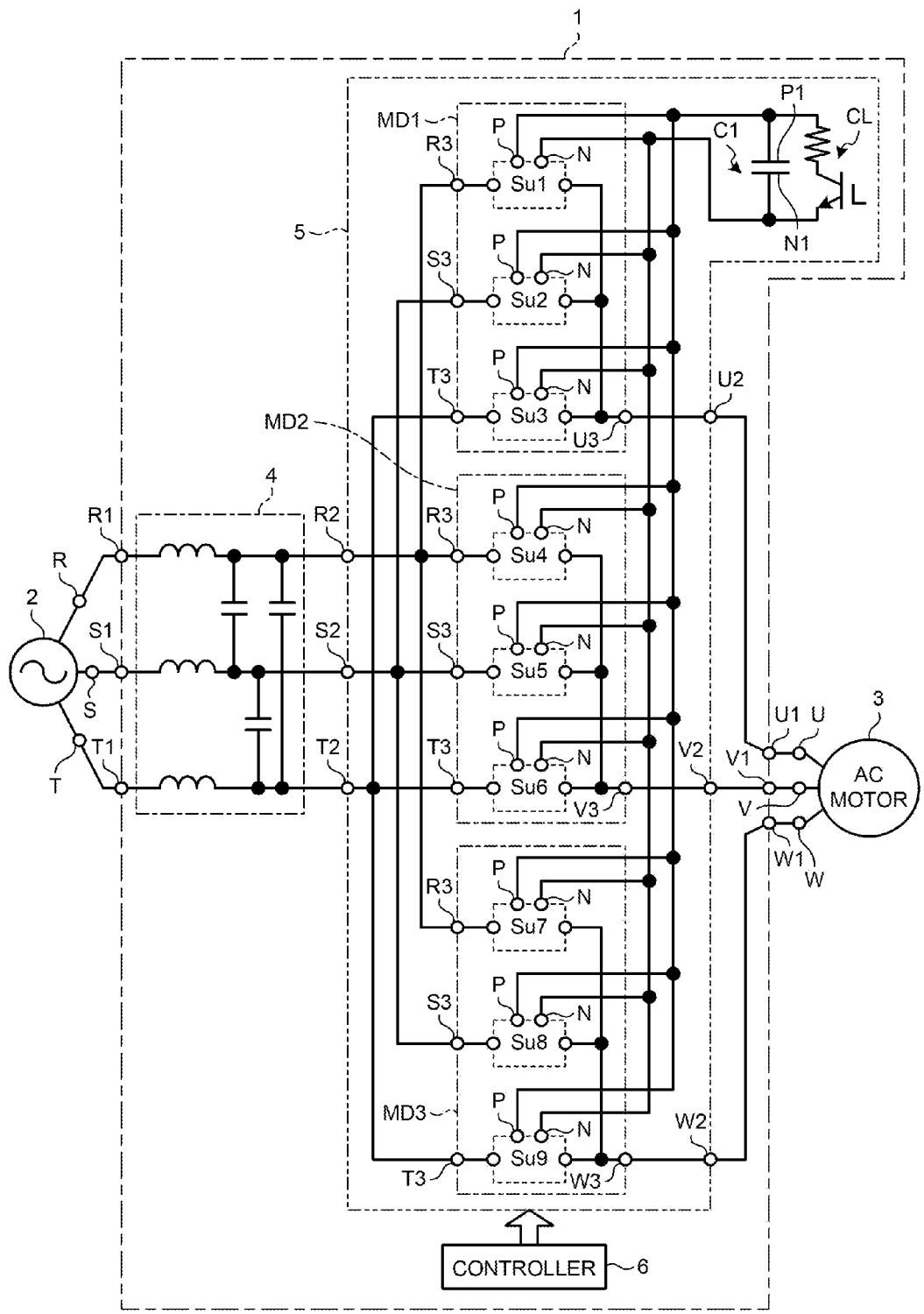
FIG. 1 is an explanatory view illustrating a matrix converter according to a first embodiment.

FIG. 1 is an explanatory view illustrating a matrix converter 1 according to the first embodiment. The following embodiment is explained by taking the matrix converter 1, as an example, that converts a three-phase alternating voltage input from a power source 2 into an arbitrary alternating voltage by pulse width modulation (PWM) control and outputs the alternating voltage to an AC motor 3. As illustrated in FIG. 1, the matrix converter 1 according to the first embodiment is provided between the three-phase AC power source 2 and the AC motor 3, and performs power conversion between the power source 2 and the AC motor 3.

The matrix converter 1 includes three input terminals R1, S1, and T1, three output terminals U1, V1, and W1, an LC filter 4, a power conversion circuit 5, and a controller 6. The input terminals R1, S1, and T1 are connected with the R-phase line, the S-phase line, and the T-phase line of the power source 2, respectively. Furthermore, the output terminals U1, V1, and W1 are connected to the U-phase line, the V-phase line, and the W-phase line of the AC motor 3, respectively.

The LC filter 4 is provided between the R-phase line, the S-phase line, and the T-phase line of the power source 2 and the power conversion circuit 5, and constituted of three reactors and three capacitors. The LC filter 4 removes a high frequency component (PWM component) attributed to switching by the below-mentioned bidirectional switch units (hereinafter, referred to as "switch units") Su1 to Su9 included in the power conversion circuit 5.

Here, one end of each of the three reactors is connected to each the corresponding one of the three input terminals R1, S1, and T1 in the matrix converter 1, and the other ends of the three reactors are connected to respective terminals R2, S2, and T2 of the power conversion circuit 5. The three capacitors are connected between the other ends of two different reactors. Here, a constitution of the LC filter 4 is not limited to the constitution illustrated in FIG. 1. For example, the LC filter 4 may have a constitution in which the three capacitors are connected among the input terminals R1, S1, and T1 in Y-connection.

The power conversion circuit 5 includes three input terminals R2, S2, and T2, three output terminals U2, V2, and W2, three power modules MD1, MD2, and MD3, a capacitor C1 (the capacitor C1 may be constituted of a plurality of capacitors parallel-connected), and a clamp circuit CL. The input terminals R2, S2, and T2 are connected via the LC filter 4 to the input terminals R1, S1, and T1, respectively. Furthermore, the output terminals U2, V2, and W2 of the power conversion circuit 5 are connected to the output terminals U1, V1, and W1 of the matrix converter 1, respectively.

Each of the power modules MD1, MD2, and MD3 includes input terminals R3, S3, and T3 connected with the input terminals R2, S2, and T2 of the power conversion circuit 5, respectively. Furthermore, the power modules MD1, MD2, and MD3 respectively include output terminals U3, V3, and W3 connected with the output terminals V2, U2, and W2 of the power conversion circuit 5, respectively.

Furthermore, the power module MD1 includes the three switch units Su1, Su2, and Su3. The switch unit Su1 is connected between the input terminal R3 and the output terminal U3 of the power module MD1. The switch unit Su2 is connected between the input terminal S3 and the output terminal U3 of the power module MD1. The switch unit Su3 is connected between the input terminal T3 and the output terminal U3 of the power module MD1.

The power module MD2 includes the switch units Su4, Su5, and Su6. The power module MD2 has the identical constitution with the power module MD1 except that the output terminal V3 is connected to the corresponding output terminal V2 of the power conversion circuit 5. Furthermore, the power module MD3 includes the switch units Su7, Su8, and Su9. The power module MD3 has the identical constitution with the power module MD1 except that the output terminal W3 is connected to the corresponding output terminal W2 of the power conversion circuit 5.

Here, the power module MD1 selectively connects any one of the R-phase line, the S-phase line, and the T-phase line of the power source 2 and the U-phase line of the AC motor 3 based on the control of the controller 6. In the same manner as above, the power module MD2 selectively connects any one of the R-, S-, and T-phase lines of the power source 2 and the V-phase line of the AC motor 3. The power module MD3 selectively connects any one of the R-, S-, and T-phase lines of the power source 2 and the W-phase line of the AC motor 3.

Each of the switch units Su1 to Su9 includes the bidirectional switch constituted of serially connected antiparallel connection circuits each of which has a unidirectional switching element and a diode. Here, one example of the specific constitution of each of the switch units Su1 to Su9 is explained later in reference to FIG. 2.

In these nine switch units Su1 to Su9, the two unidirectional switching elements constituting the bidirectional switch are individually turned on and off by PWM control based on the control of the controller 6 and hence, the direction of the current, voltage, and the current value are controlled.

Here, as will be specifically explained later, the switch units Su1 to Su9 include diodes for the snubber circuit so as to ensure the commutation passage (conduction passage bypassing the bidirectional switch) of a current having flowed immediately before the bidirectional switch is switched over from an ON-state to an OFF-state.

The current flow bypassing the bidirectional switch is output from a terminal P of each of the switch units Su1 to Su9, input to a terminal N of each of the switch units Su1 to Su9 via the capacitor C1 for the snubber circuit, and output from each of the output terminals U3, V3, and W3, or each of the input terminals R3, S3, and T3. Accordingly, in the matrix converter 1, when the bidirectional switch is turned off to interrupt a passage in which a current flows, the occurrence of switching surge voltage can be suppressed.

In this manner, in the matrix converter 1, the snubber circuit is constituted of the diodes and the capacitor C1 therefor, the diodes being included in the switch units Su1 to Su9. Furthermore, in the matrix converter 1, some of the switch units Su1 to Su9 share some of the diodes for the snubber circuit and additionally, the diodes for the snubber circuit is provided in the inside of the power modules MD1, MD2, and MD3 thus optimizing the snubber circuit. One example of the specific constitution of the snubber circuit will be explained later in reference to FIG. 2.

The clamp circuit CL includes a resistor and a transistor that are connected with each other in series and connected with the capacitor C1 in parallel. The clamp circuit CL restricts a voltage between terminals of the capacitor C1 to the predetermined voltage or lower based on the control of the controller 6 thus preventing the breakage of the capacitor C1 caused by overvoltage.

The controller 6 generates a switch driving signal for outputting a voltage corresponding to the desired-voltage instruction by the known PWM control method of a matrix converter and outputs the signal to the power conversion circuit 5.

The power conversion circuit 5 performs power conversion in a way that the unidirectional switching elements included in the switch units Su1 to Su9 are turned on and off by PWM control in response to the switch driving signal input from the controller 6.

Furthermore, the controller 6 applies, when a voltage between the terminals of the capacitor C1 is increased to the predetermined threshold, a gate voltage to the gate of the transistor in the clamp circuit CL and turns on the transistor thus preventing the breakage of the capacitor C1. Here, the voltage between the terminals of the capacitor C1 is detected by a voltage detector that is not illustrated in the drawings.

Figure 2:
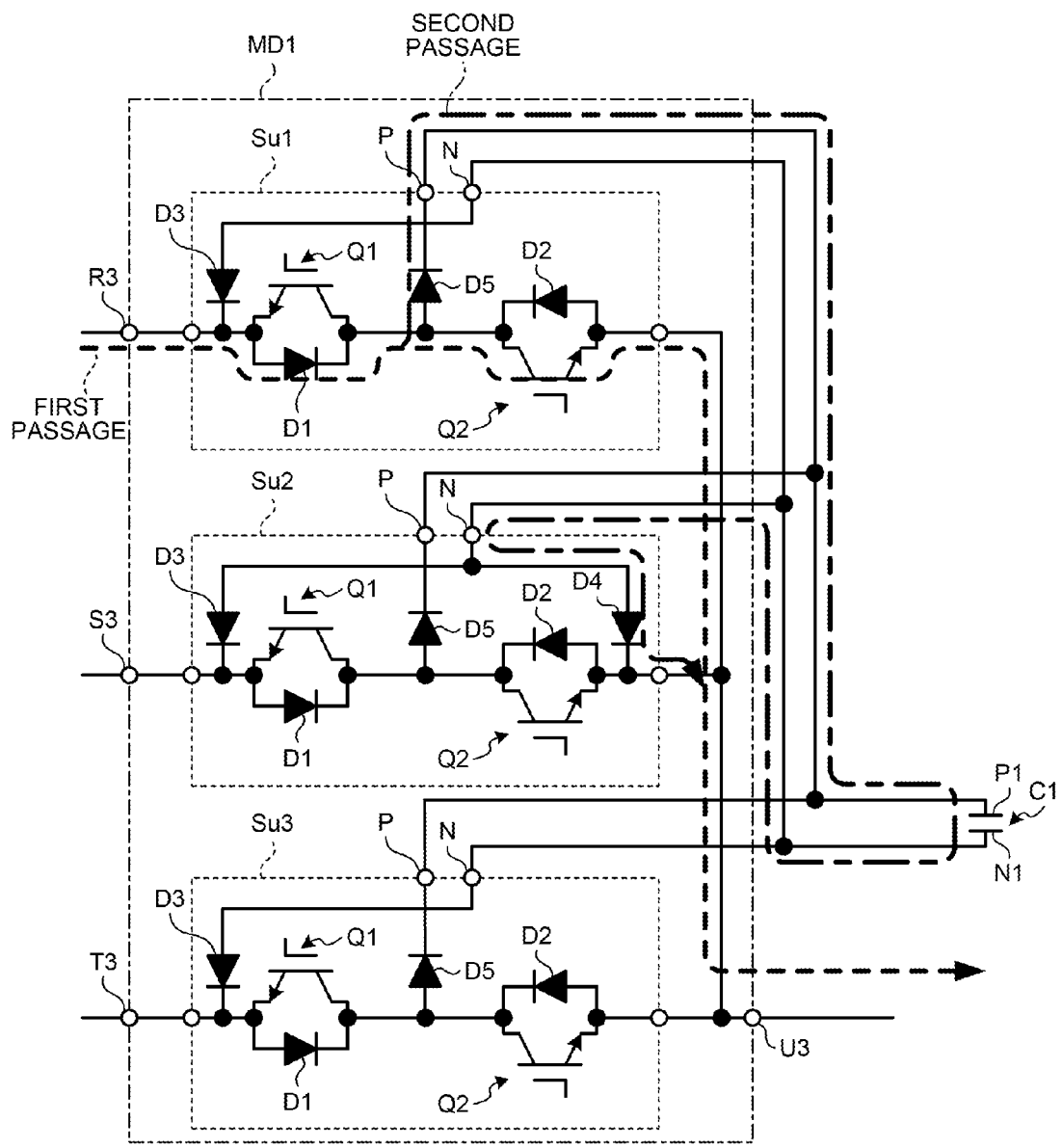
FIG. 2 is an explanatory view illustrating a power module according to the first embodiment.

In reference to FIG. 2, the following describes the power modules MD1, MD2, and MD3 included in the power conversion circuit 5. Here, the three power modules MD1, MD2, and MD3 have identical constitutions. Therefore, hereinafter, only the power module MD1 is explained, and the explanations of the other two power modules MD2 and MD3 are omitted.

FIG. 2 is an explanatory view illustrating the power module MD1 according to the first embodiment. As illustrated in FIG. 2, the power module MD1 includes the three switch units Su1, Su2, and Su3. Each of the switch units Su1, Su2, and Su3 includes a bidirectional switch in which an antiparallel circuit having a unidirectional switching element Q1 and a diode D1 and an antiparallel circuit having a unidirectional switching element Q2 and a diode D2 are serially connected with each other.

Each of the unidirectional switching elements Q1 and Q2 is, for example, a semiconductor device such as an insulated gate bipolar transistor (IGBT). Here, although the present embodiment is explained by taking, as an example, a bidirectional switch in which the collectors of the unidirectional switching elements Q1 and Q2 are connected to each other, the bidirectional switch may adopt, as explained later in reference to FIG. 4, a constitution such that emitters of the unidirectional switching elements Q1 and Q2 are connected to each other.

Furthermore, each of the switch units Su1, Su2, and Su3 includes a diode (first diode) D5 whose anode is connected to the point of connection between the two unidirectional switching elements Q1 and Q2 of which the bidirectional switch is constituted and cathode is connected to an upper electrode P1 of the capacitor C1. Each of the switch units Su1, Su2, and Su3 includes a diode (third diode) D3 whose anode is connected to a lower electrode N1 of the capacitor C1 and cathode is connected to the corresponding input terminal R, S, or T.

Any one of the three switch units Su1, Su2, and Su3 (the switch unit Su2 in FIG. 2) includes a diode (second diode) D4 whose anode is connected to the lower electrode N1 of the capacitor C1 and cathode is connected to an output terminal U. In this manner, the three switch units Su1, Su2, and Su3 have identical constitutions except that the switch unit Su2 includes the diode 4.

In the power module MD1, for example, when a current flows from an R3-phase line to a U3-phase line (when an output current is a positive current), the unidirectional switching element Q2 of the switch unit Su1 is turned on to flow the current through a first passage. Thereafter, when a current flows from a S3-phase line to the U3-phase line, the unidirectional switching element Q2 of the switch unit Su1 is first turned off and a short time later, the unidirectional switching element Q2 of the switch unit Su2 is turned on.

In this case, the current having flowed through the switch unit Su1 immediately before the unidirectional switching element Q2 of the switch unit Su1 is turned off flows from the point of connection between the two unidirectional switching elements Q1 and Q2 to the output terminal U3 via a second passage bypassing the unidirectional switching element Q2. To be more specific, the current input from the input terminal R3 is output from the output terminal U3 via the diode D1, the diode D5, the capacitor C1, and the diode D4.

In this manner, in the power module MD1, after the unidirectional switching element Q1 of the switch unit Su1 is switched over from an on-state to an off-state, the previous current flow is maintained, which suppresses a surge voltage that occurs by turning off the switch unit Su1.

Furthermore, in the power module MD1, to consider a case where a current flows from the U3-phase line to the R3-phase line (an output current is a negative current), when the unidirectional switching element Q1 of the switch unit Su1 is turned off, the current is maintained by flowing through the output terminal U3, the diodes D2 and D5 of the switch unit Su1, the capacitor C1, the diode D3, and the input terminal R3. Here, when each of the other two switch units Su2 and Su3 is switched over from an on-state to an off-state, the current flows through the passage same as above thus maintaining the previous current flow.

In this manner, with respect to the power module MD1, the snubber circuit is constituted of the diodes D3 and D5 of each of the switch units Su1, Su2, and Su3, the capacitor C1, and the diode D4 of the switch unit Su2.

Furthermore, in the power module MD1, as a diode for outputting a current input from the capacitor C1 to the output terminal U3, the diode D4 of the switch unit Su2 is shared by the three switch units Su1, Su2, and Su3. Therefore, according to the power module MD1, it is unnecessary to provide the diode D4 for outputting a current input from the capacitor C1 to the output terminal U to each of the switch units Su1, Su2, and Su3 thus reducing the costs of the switch units Su1, Su2, and Su3.

In the power module MD1, the diodes D3, D4, and D5 for the snubber circuit are all provided in the inside of the power module and hence, it is also unnecessary to provide the diodes D3, D4, and D5 for the snubber circuit as separate modules thus realizing the downsizing and cost reduction of the matrix converter 1.

As mentioned above, a matrix converter according to the first embodiment includes a plurality of input terminals and a plurality of output terminals. In addition, the matrix converter includes a power conversion circuit in which each of bidirectional switches is arranged between each input terminal and each output terminal, and a snubber circuit connected to the bidirectional switch. Here, each of the bidirectional switches is constituted of serially connected antiparallel connection circuits each of which has a unidirectional switching element and a diode.

The snubber circuit includes the first diode and the capacitor, in which one end of the first diode is connected to the point of connection between the two unidirectional switching elements that constitute the bidirectional switch, and one end of the capacitor is connected to the other end of the first diode. The snubber circuit includes a second diode whose one end is connected to the other end of the capacitor and the other end is connected to an output terminal.

In the snubber circuit, the other end of the second diode is connected to only a part of the bidirectional switches. The bidirectional switches connected between one of the output terminals and each of the input terminals, the first diodes connected to the respective bidirectional switches, and the second diode are arranged in one power module. The power module is provided to the corresponding output terminal.

In the power module, the second diode connected to only a part of the bidirectional switches is arranged. According to the first embodiment, the snubber circuit is optimized thus realizing the downsizing and cost reduction of the matrix converter. Furthermore, in FIG. 2 (also in FIG. 1, FIG. 4, FIG. 11, FIG. 13, and FIG. 14), although terminals P or terminals N of the three bidirectional switches are connected in common outside the power module MD1, the terminals P or the terminals N may be connected in common inside the power module MD1 so as to provide a pair of the terminal P and the terminal N outside the power module.

The constitution of the power module according to the first embodiment is not limited to the example illustrated in FIG. 2. Here, in reference to FIG. 3, a power conversion circuit including a power module MD1a according to a modification 1 is explained.

Figure 3:
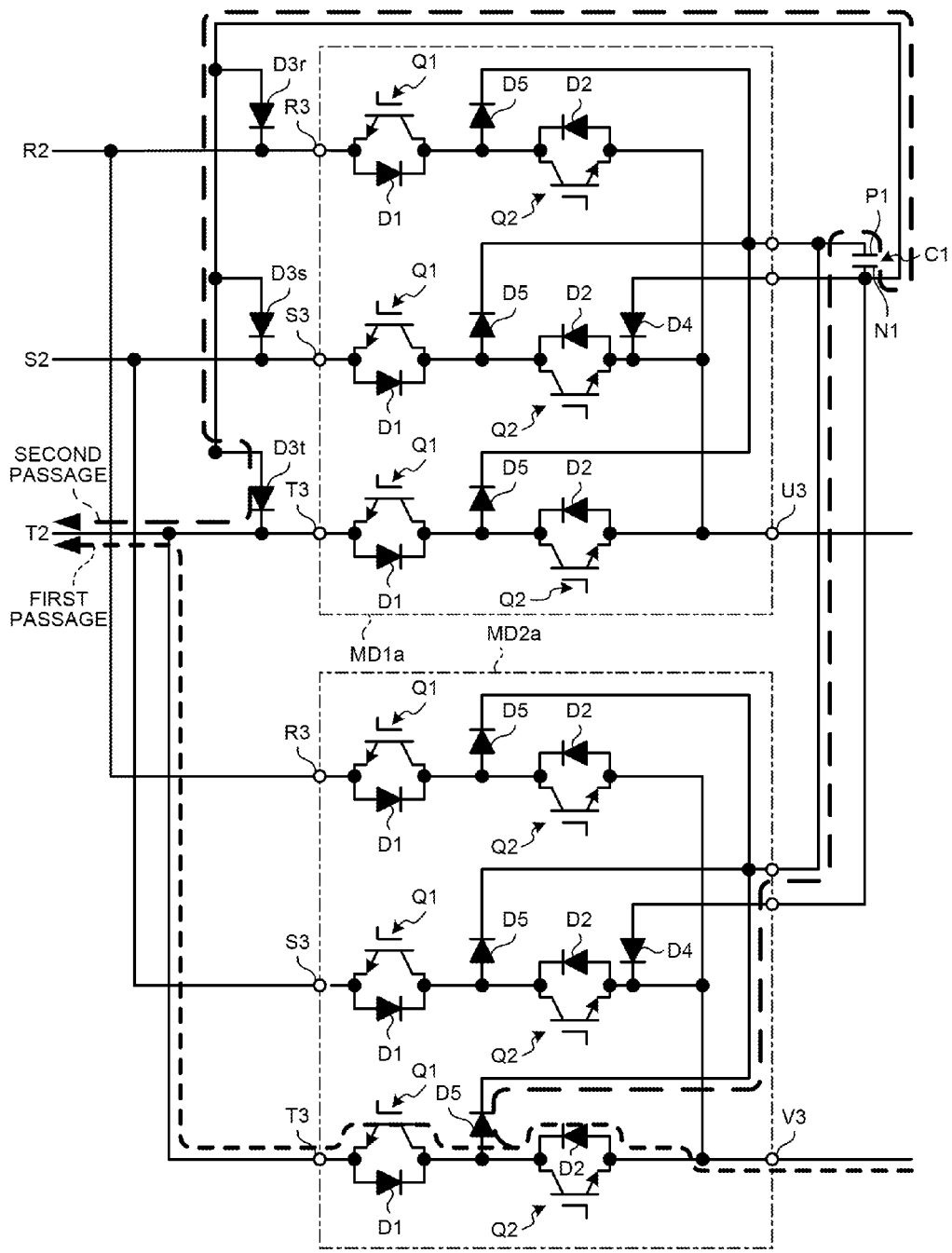
FIG. 3 is an explanatory view illustrating a part of a power conversion circuit according to a first modification.

FIG. 3 is an explanatory view illustrating a part of the power conversion circuit according to the modification 1. In FIG. 3, a power module MD1a for a U-phase line and a power module MD2a for a V-phase line are illustrated. Here, a power module for a W-phase line has the same constitution as the power modules MD1a and MD2a, and the illustration thereof is omitted. Furthermore, out of constitutional parts illustrated in FIG. 3, parts having the identical functions with those of the parts illustrated in FIG. 2 are given same numerals as those of the parts illustrated in FIG. 2 and their explanations are omitted.

As illustrated in FIG. 3, the power module MD1a provided to the power conversion circuit according to the modification 1 includes parts other than the three diodes D3 in the power module MD1 illustrated in FIG. 2 in the inside thereof. Here, the three diodes D3 in the power module MD1 illustrated in FIG. 2 is replaced by diodes D3r, D3s, and D3t provided outside the power module MD1a. The constitutions of the two power modules MD1a and MD2a are identical with each other.

In the power conversion circuit, for example, when a current flows from a V3-phase line to a T3-phase line (when an output current is a negative current), the current flows through a first passage via an output terminal V3, a diode D2, a unidirectional switching element Q1, and an input terminal T3 in the power module Md2a.

Thereafter, when the unidirectional switching element Q1 of the power module MD2a is turned off, the current having flowed immediately before the unidirectional switching element Q1 is turned off is maintained by flowing through a second passage illustrated in FIG. 3. To be more specific, the current is maintained by flowing through the second passage via the output terminal V3 and diodes D2 and D5 of the power module MD2a, a capacitor C1, and the diode D3t.

Here, when a current has flowed from the U3-phase line to the T3-phase line immediately before the unidirectional switching element Q1 is turned off, in the same manner as the case where a current has flowed from the V3-phase line to the T3-phase line immediately before the unidirectional switching element Q1 is turned off, the current is maintained by flowing through the second passage via the diodes D2 and D5, the capacitor C1, and the diode D3t.

When a current has flowed from the U3-phase line, the V3-phase line, or the W3-phase line to the R3-phase line, and when a current has also flowed from the U3-phase line, the V3-phase line, or the W3-phase line to the S3-phase line, the current having flowed immediately before the unidirectional switching element Q1 is turned off is maintained.

According to the power conversion circuit, the diodes D3r, D3s, and D3t can be shared as diodes for the snubber circuit by the power module MD1a for the U-phase line, the power module MD2a for the V-phase line, and a power module for the W-phase line. Therefore, as the whole matrix converter, for example, the number of diodes is reduced by six compared with the case that the three power modules MD1 illustrated in FIG. 2 are provided so as to optimize the snubber circuit thus realizing the cost reduction. Furthermore, to consider that the diode D4 is shared, the following advantageous effect can be achieved; that is, one kind of power module is sufficient (as the whole matrix converter, three power modules identical with each other are sufficient) while maximizing the effect of reducing the number of diodes (reducing by 12).

Furthermore, each of the power modules MD1a and MD2a illustrated in FIG. 3 includes one diode D4 and three diodes D5 in the inside thereof. In this manner, for example, compared with the case that all of the diodes D3, D4, and D5 for the snubber circuit are provided outside the power module as a different module, manufacturing costs as the whole matrix converter can be lowered.

In this manner, in the power conversion circuit according to the modification 1, a third diode whose one end is connected to the other end of the capacitor and the other end is connected to the input terminal is provided outside the power module, and the other end of the corresponding third diode is connected to the input terminals of only a part of the three power modules. According to the modification 1, the cost of the whole matrix converter can be lowered by optimizing the snubber circuit.

Figure 4:
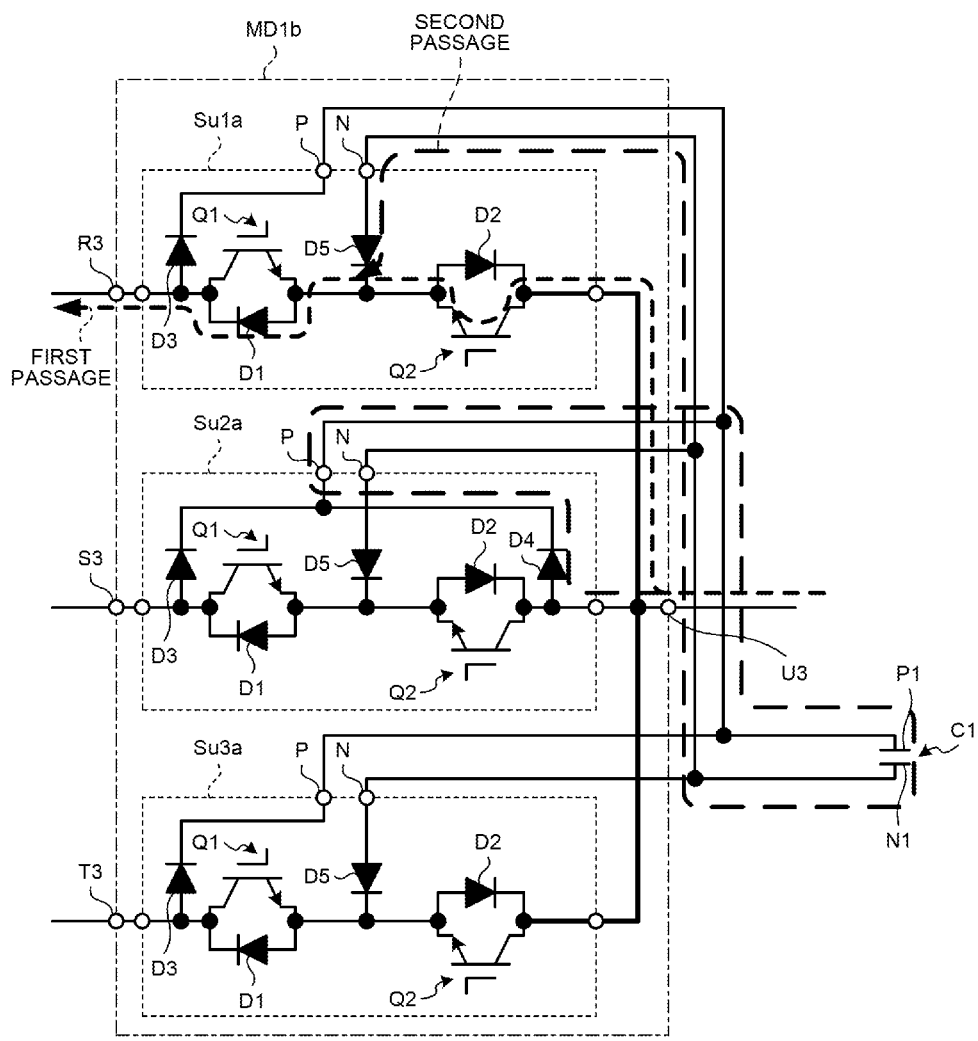
FIG. 4 to FIG. 6 are explanatory views each illustrating a power module according to a second modification.
Figure 5:
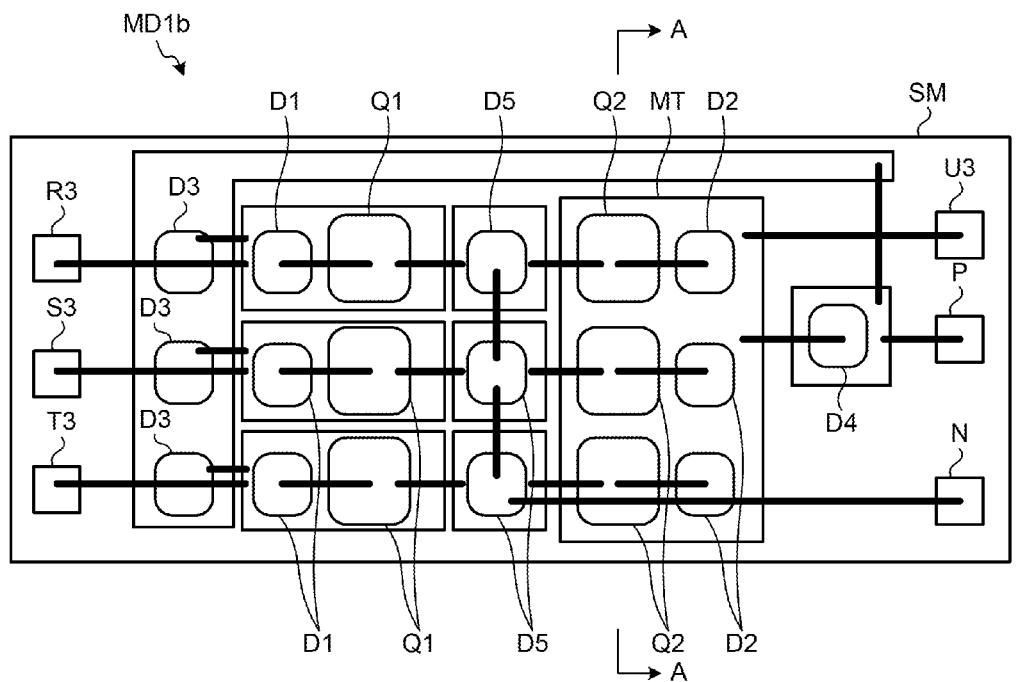
Figure 6:
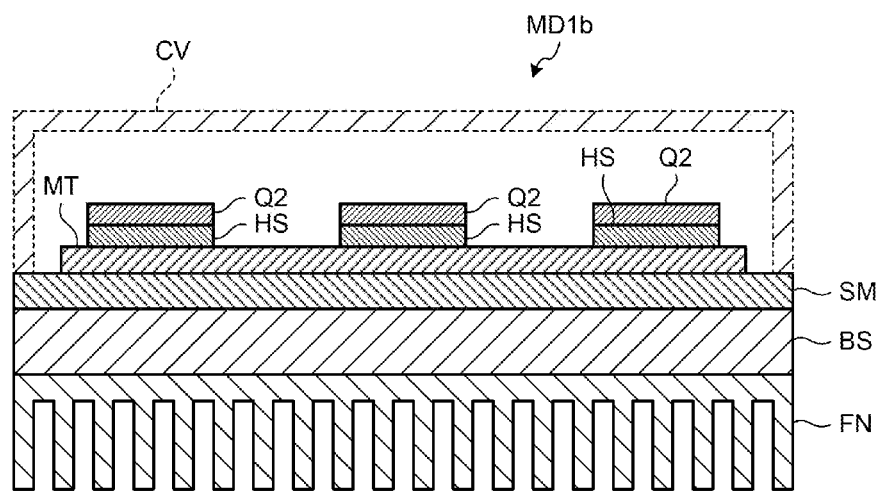

Next, in reference to FIG. 4 to FIG. 6, a power module MD1b according to a modification 2 is explained. FIG. 4 to FIG. 6 are explanatory views each illustrating the power module MD1b according to the modification 2. To be more specific, FIG. 4 is the explanatory view illustrating the circuit constitution of the power module MD1b, FIG. 5 is the explanatory view of the power module MD1b as viewed in a plan view, and FIG. 6 is the explanatory view illustrating the sectional view of the power module MD1b taken along a line A-A in FIG. 5. Here, in FIG. 4 to FIG. 6, parts having the identical functions with those illustrated in FIG. 2 are given same numerals as those illustrated in FIG. 2.

As illustrated in FIG. 4, the power module MD1b includes three switch units Su1a, Su2a, and Su3a. In the three switch units Su1a, Su2a, and Su3a, the direction of each of the anode and the cathode of each diode D1, D2, D3, or D4, as well as the direction of each of the collector and the emitter of each unidirectional switching element, is opposite to the direction of that illustrated in FIG. 2.

That is, in the switch units Su1a, Su2a, and Su3a, the emitters of the unidirectional switching elements Q1 and Q2 of which each bidirectional switch is constituted are connected to each other. Furthermore, the cathode of the diode D5 (first diode) is connected to the point of connection between the two unidirectional switching elements Q1 and Q2, and the anode of the diode D5 (first diode) is connected to the lower electrode N1 of the capacitor C1.

In the power module MD1b, for example, when a current flows from the U3-phase line to the R3-phase line (an output current is a negative current), the current flows through a first passage via the output terminal U3, the unidirectional switching element Q2, and the diode D1 in the switch unit Su1a. Thereafter, when the unidirectional switching element Q2 of the switch unit Su1a is turned off, the current having flowed immediately before the unidirectional switching element Q2 is turned off is maintained by flowing through a second passage via the output terminal U3, the diode D4 of the switch unit Su2a, the capacitor C1, and the diodes D5 and D1 of the switch unit Su1a.

Furthermore, when the current has flowed from the U3-phase line to the S3-phase line immediately before the switching element Q2 is turned off, as well as when the current has flowed from the U3-phase line to the T3-phase line, the current is maintained by flowing through a passage via the diode D4, the capacitor C1, and the diodes D5 and D1. Here, when a current has flowed from the R3-phase line, the S3-phase line, or the T3-phase line to the U3-phase line immediately before the unidirectional switching element Q2 is turned off (an output current is a positive current), the current is maintained by flowing through a passage via the diode D3 of each of the switch units Su1a, Su2a, and Su3a, the capacitor C1, and the diodes D5 and D2.

In this manner, also in the power module MD1b, the diode D4 of the switch unit Su2a is shared as a diode that outputs a current input from the U3-phase line to the capacitor C1 by the three switch units Su1a, Su2a, and SU3a. Therefore, the snubber circuit can also be optimized by the use of the power module MD1b according to the modification 2.

Here, in a state that a current flows from the U3-phase line to the R3-phase line, when the unidirectional switching element Q2 of the switch unit Su1a is turned off, the current having flowed between the output terminal U3 and the collector of the unidirectional switching element Q2 immediately before the unidirectional switching element Q2 is turned off loses the destination thereof. In a state that a current flows from the U3-phase line to the T3-phase line, when the unidirectional switching element Q2 of the switch unit Su3a is turned off, the current having flowed between the output terminal U and the collector of the unidirectional switching element Q2 also loses the destination thereof. The current that loses the destination thereof may result in a surge voltage.

Consequently, in the power module MD1b according to the modification 2, the collector-sides of the three of IGBTs or silicon carbide (SiC) transistors Q2 are connected to the U3-phase line in common thus constituting the three unidirectional switching elements Q2. Furthermore, the power module MD1b includes, as illustrated in FIG. 5, a planar-shaped conductor MT with which the collector sides (a bottom surface of a transistor-Q2 chip) of a plurality of (three, in this case) unidirectional switching elements Q2 connected to the output terminal U3 in common are brought into contact in common. Here, in FIG. 5, each diode is arranged in a posture with the cathode side thereof down. In this case, the collectors are connected by the common planar-shaped conductor on a side opposite to a side on which the emitters are connected to each other.

The power module MD1b includes, for example, as illustrated in FIG. 6, a heat radiation fin FN arranged on the lowermost layer thereof, a copper base plate BS arranged on the heat radiation fin FN, and a ceramic substrate SM for insulation on the copper base plate BS. The planar-shaped conductor MT (a foil pattern or a block plate that is made of copper or aluminum, for example) is provided on the ceramic substrate SM, and the three unidirectional switching elements Q2 are provided on the planar-shaped conductor MT directly or by way of a heat spreader HS comprised of a metal block.

Each of the unidirectional switching elements Q2 is arranged in a state that the lower surface thereof that constitutes a collector is brought into contact with the upper surface of the heat spreader HS, and a gate and an emitter are extended from the upper surface side of each of the unidirectional switching elements Q2. Here, each circuit element including the unidirectional switching elements Q2 is covered with a cover CV.

In this manner, in the power module MD1b, the output terminal U3 and the collector of the unidirectional switching element Q2 are connected to each other with the use of the planar-shaped conductor MT while making the connection therebetween thick and short. In this manner, an inductance of the connecting part between the output terminal U3 and the unidirectional switching element Q2 (see the passage indicated by a bold line in FIG. 4) can be reduced, which suppresses the occurrence of the surge voltage attributed to the current that loses the destination thereof in the passage indicated by the bold line in FIG. 4.

Figure 7:
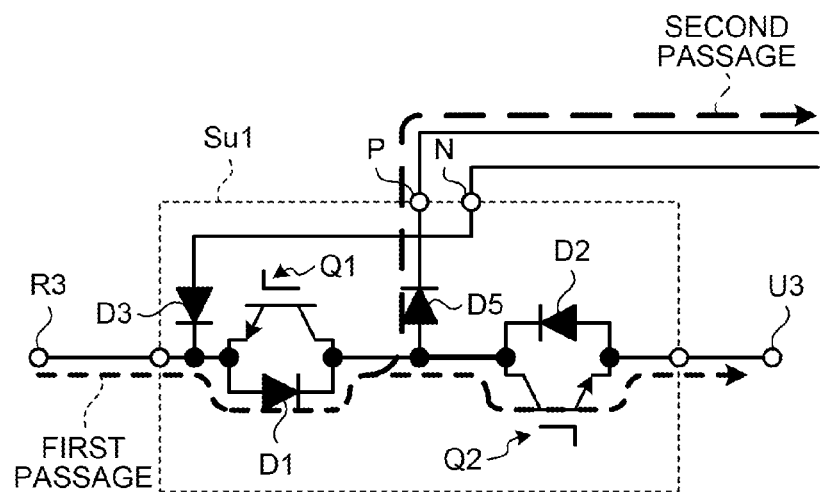
FIG. 7 and FIG. 8 are explanatory views each illustrating the flow of current in a switch unit illustrated in FIG. 1.
Figure 8:
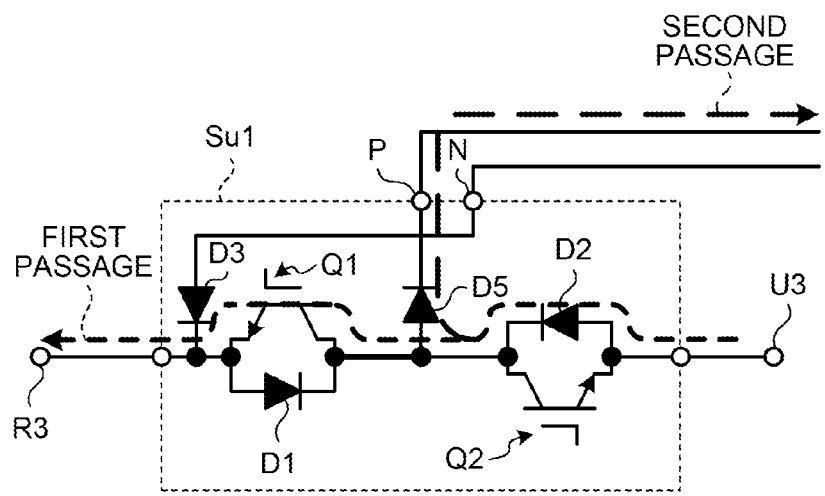
Figure 9:
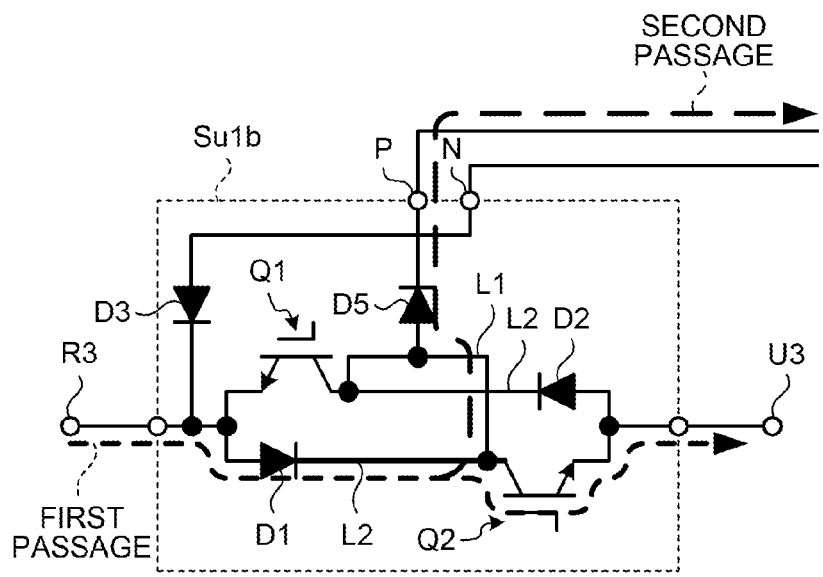
FIG. 9 and FIG. 10 are explanatory views each illustrating a switch unit according to a third modification.
Figure 10:
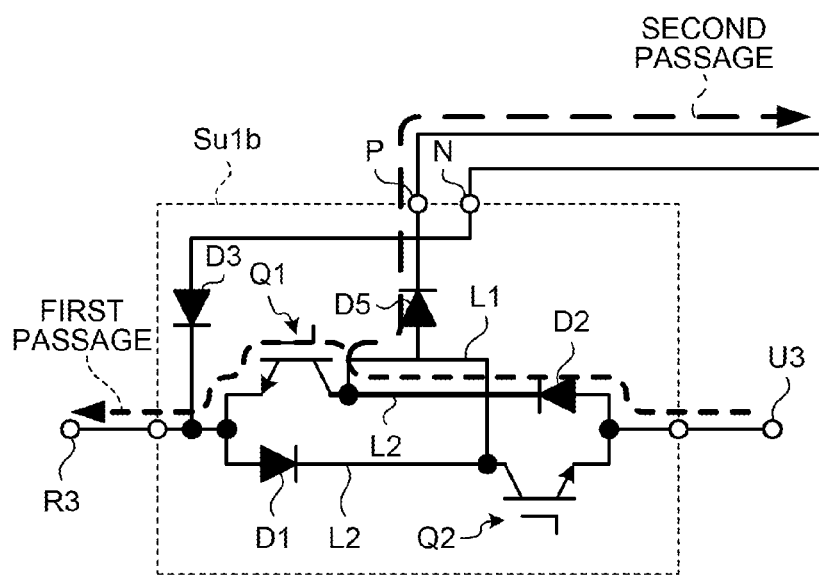

Next, in reference to FIG. 7 to FIG. 10, an additional modification of a switch unit is explained. A switch unit Su1b according to a modification 3 is explained. FIG. 7 and FIG. 8 are explanatory views each illustrating the flow of current in the switch unit Su1 illustrated in FIG. 1. FIG. 9 and FIG. 10 are explanatory views each illustrating the switch unit Su1b according to the modification 3.

As illustrated in FIG. 7, in the switch unit Su1, in a state that a current flows from a R3-phase line to a U3-phase line through a first passage, when a unidirectional switching element Q2 is turned off, the current is maintained by flowing through a second passage. However, in this case, the current having flowed between the anode of a diode D5 and the collector of the unidirectional switching element Q2 immediately before the unidirectional switching element Q2 is turned off loses the destination thereof.

On the other hand, as illustrated in FIG. 8, in a state that a current flows from the U3-phase line to the R3-phase line through a first passage, when a unidirectional switching element Q1 is turned off, the current is maintained by flowing through a second passage. However, in this case, the current having flowed between the collector of the unidirectional switching element Q1 and the anode of the diode D5 immediately before the unidirectional switching element Q1 is turned off loses the destination thereof. The current that loses the destination thereof may, as described above, result in the occurrence of surge voltage.

Consequently, as illustrated in FIG. 9, a bidirectional switch of the switch unit Su1b according to the modification 3 includes a first conductor L1 that connects the two unidirectional switching elements Q1 and Q2 in series. The bidirectional switch includes a second conductor L2 that connects the unidirectional switching element Q1 and a diode D2 in series, and a second conductor L2 that connects the unidirectional switching element Q2 and a diode D1 in series. In the bidirectional switch, the anode of the diode D5 is connected to the first conductor L1.

In this manner, as illustrated in FIG. 9, in a state that a current flows from an R3-phase line to a U3-phase line through a first passage, when the flow of the current is switched so that the current flows through a second passage, it is possible to reduce the size of a section where the current loses the destination thereof by the first conductor L1 that connects the two unidirectional switching elements Q1 and Q2 in series. Furthermore, as illustrated in FIG. 10, in a state that a current flows from the U3-phase line to the R3-phase line through a first passage, when the flow of current is switched so that the current flows through a second passage, in the same manner as above, it is possible to reduce the size of a section where the current loses the destination thereof. Therefore, according to the switch unit Su1b in the modification 3, the occurrence of the surge voltage can be suppressed.

Figure 11:
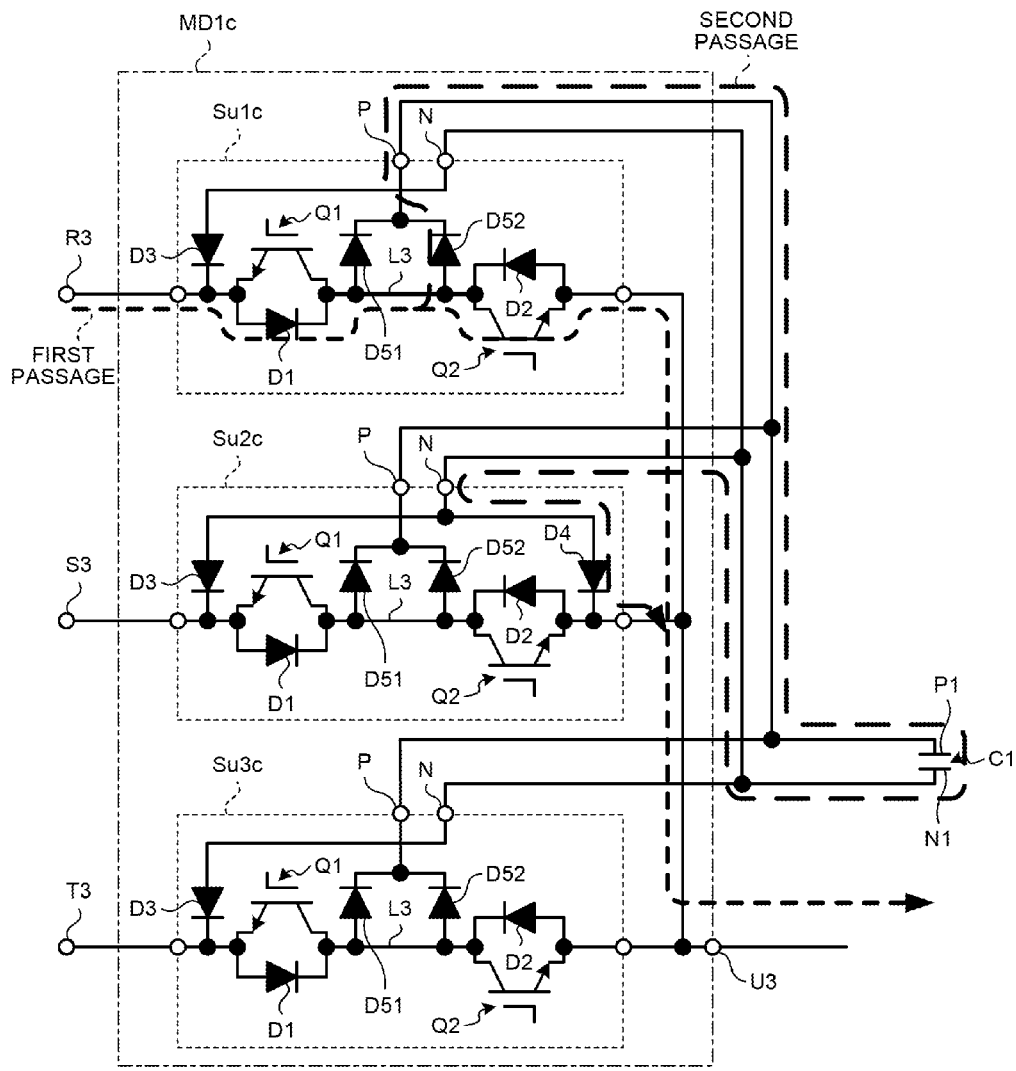
FIG. 11 is an explanatory view illustrating a power module provided with switch units according to a fourth modification.

Furthermore, as illustrated in FIG. 11, the occurrence of the surge voltage can also be suppressed by constituting switch units Su1c, Su2c, and Su3c. FIG. 11 is an explanatory view illustrating a power module MD1c provided with the switch units Su1c, Su2c, and Su3c according to a modification 4.

As illustrated in FIG. 11, the power module MD1c according to the modification 4 differs from that illustrated in FIG. 2 in that each of the switch units Su1c, Su2c, and Su3c includes diodes D51 and D52 in place of the diode D5 (see FIG. 2).

To be more specific, as illustrated in FIG. 11, the switch unit Su1c includes a third conductor L3 that serially connects an antiparallel connection circuit constituted of a unidirectional switching element Q1 and a diode D1, and a antiparallel connection circuit constituted of a unidirectional switching element Q2 and a diode D2.

A bidirectional switch of the switch unit Su1c is constituted by connecting anodes of the separate diodes 51 and D52 (first diodes) to both ends of the third conductor L3. Here, the switch unit Su3c is identical with the switch unit Su1c with respect to the constitution. Furthermore, the switch unit Su2c is identical with the switch unit Su1c with respect to the constitution except that the switch unit Su2c includes a diode D4.

In this manner, in the power module according to the modification 4, for example, in a state that a current flows from the R3-phase line to the U3-phase line through the first passage illustrated in FIG. 11, when the flow of current is switched so that the current flows through a second passage, the size of a section where the current loses the destination thereof is reduced, which suppresses the occurrence of the surge voltage.

Figure 12:
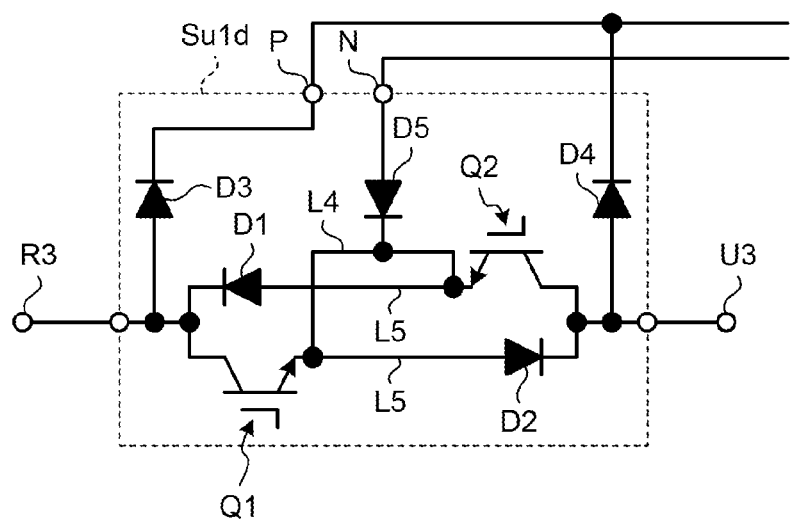
FIG. 12 is an explanatory view illustrating a switch unit according to a fifth modification.

Here, in the case of a switch unit in which emitters of the two unidirectional switching elements Q1 and Q2 of which the bidirectional switch is constituted are connected to each other, for example, as illustrated in FIG. 12, the occurrence of the surge voltage can be suppressed by constituting a switch unit Su1d. FIG. 12 is an explanatory view illustrating the switch unit Su1d according to a modification 5.

As illustrated in FIG. 12, the bidirectional switch of the switch unit Su1d according to the modification 5 includes a fourth conductor L4 that serially connects the emitters of the two unidirectional switching elements Q1 and Q2. In addition, the bidirectional switch includes a fifth conductor L5 that serially connects the unidirectional switching element Q1 and a diode D2, and a fifth conductor L5 that serially connects the unidirectional switching element Q2 and a diode D1.

Furthermore, in the bidirectional switch, a cathode of the diode D5 is connected to the fourth conductor L4. In this manner, even in the case of the switch unit Su1d in which the emitters of the unidirectional switching elements Q1 and Q2 are connected to each other, in a state that a current flows between the R3-phase line and the U3-phase line, when the unidirectional switching elements Q1 and Q2 are turned off, in the same manner as the case illustrated in FIG. 9 and FIG. 10, the size of the section where the current loses the destination thereof is reduced. Therefore, the occurrence of the surge voltage can be suppressed.

Second Embodiment

Figure 13:
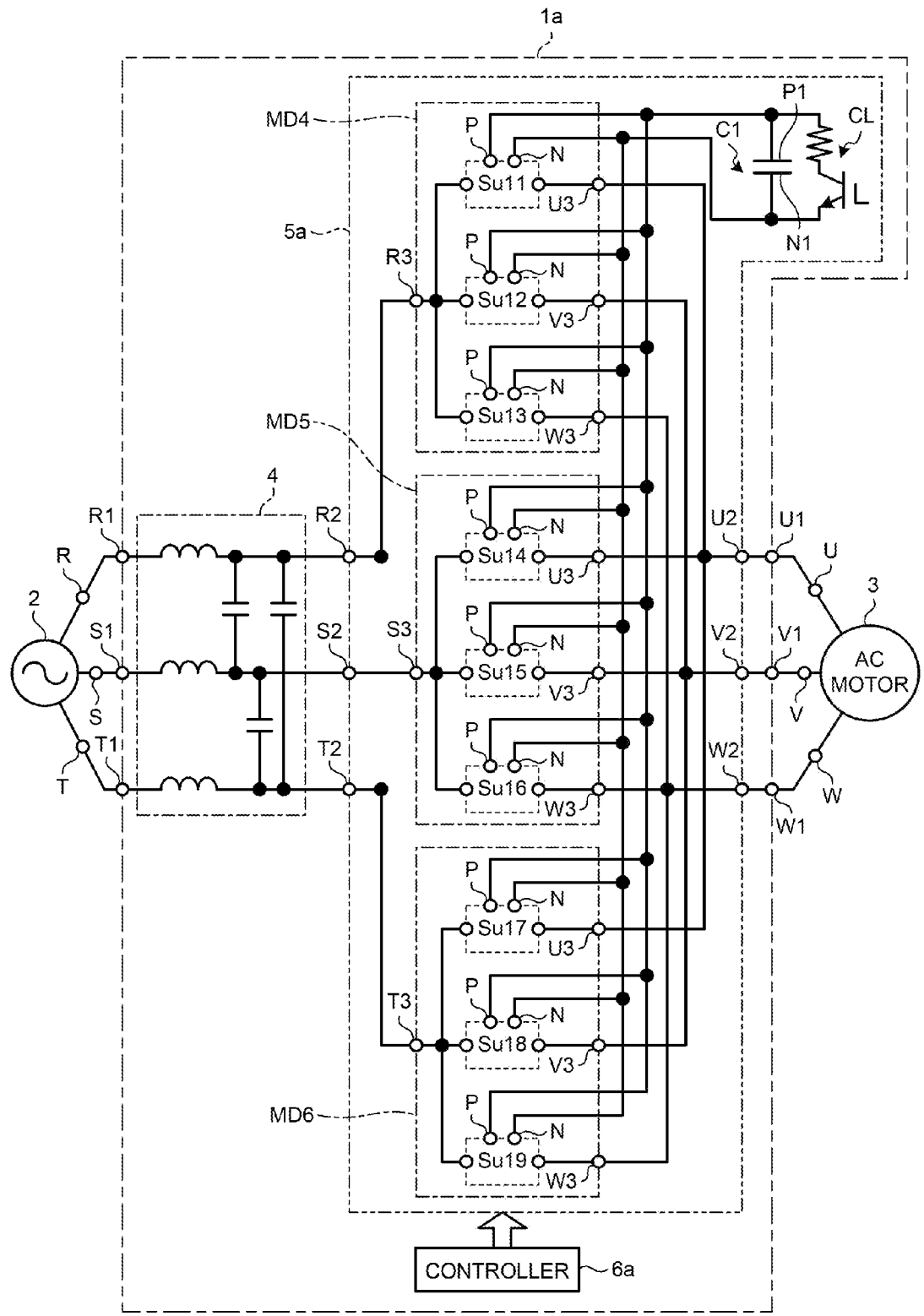
FIG. 13 is an explanatory view illustrating a matrix converter according to a second embodiment.
Figure 14:
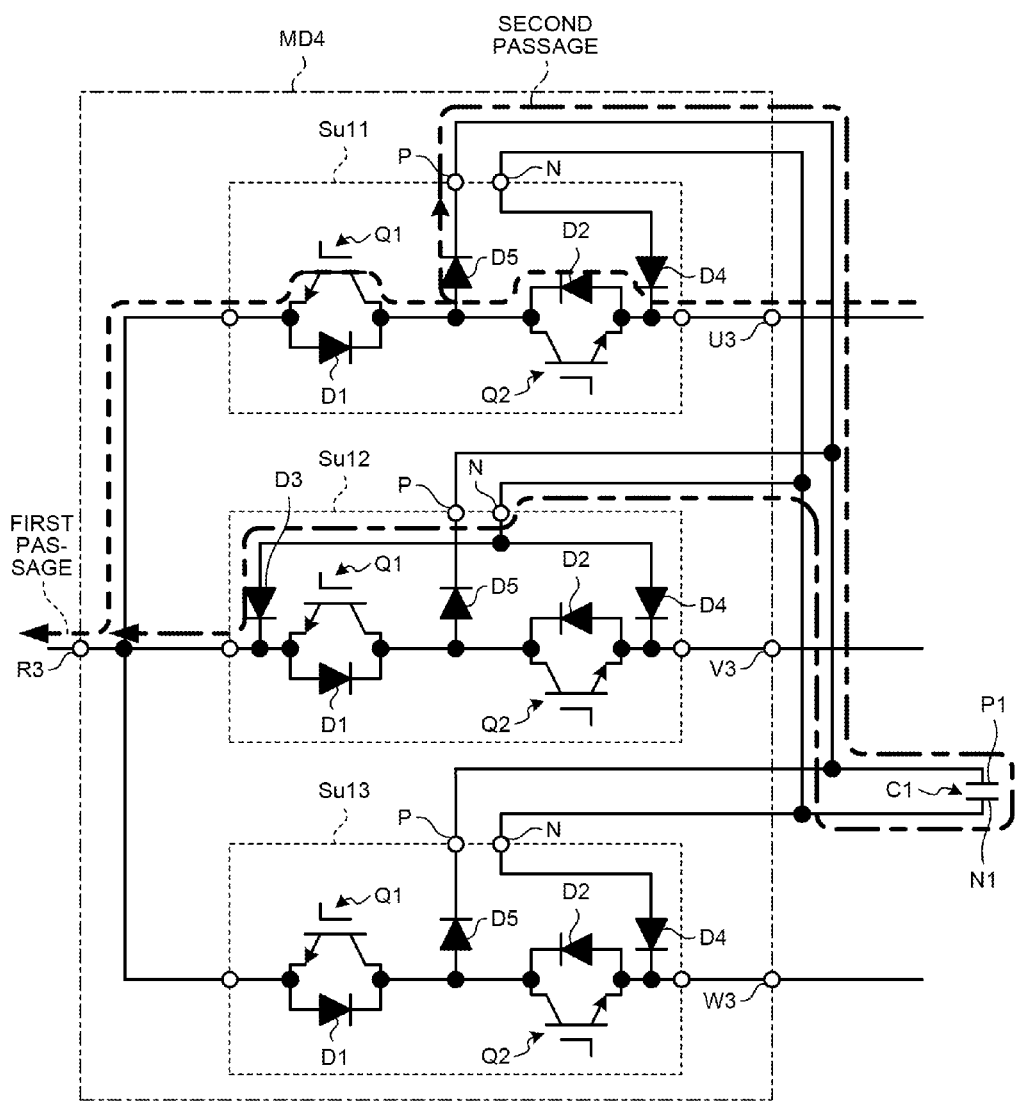
FIG. 14 is an explanatory view illustrating a power module according to the second embodiment.

Next, in reference to FIG. 13 and FIG. 14, a matrix converter 1a according to the second embodiment is explained. FIG. 13 is an explanatory view illustrating the matrix converter 1a according to the second embodiment. FIG. 14 is an explanatory view illustrating a power module MD4 according to the second embodiment. Here, out of constitutional parts illustrated in FIG. 13 and FIG. 14, parts identical with those illustrated in FIG. 1 and FIG. 2 are given same numerals as those of the parts illustrated in FIG. 1 and FIG. 2, and their explanations are omitted.

As illustrated in FIG. 13, the matrix converter 1a differs from the matrix converter illustrated in FIG. 1 with respect to the constitution of a power conversion circuit 5a. To be more specific, the power conversion circuit 5a includes three power modules MD4, MD5, and MD6.

The power module MD4 includes three switch units Su11, Su12, and Su13 that selectively connect between an R-phase line of a power source 2 and each of a U-phase line, a V-phase line, and an R-phase line of an AC motor 3 based on the control of a controller 6a. The power module MD5 includes three switch units Su14, Su15, and Su16 that selectively connect an S-phase line of the power source 2 and each of the U-phase, the V-phase line, and the R-phase line of the AC motor 3 based on the control of the controller 6a. The power module MD6 includes three switch units Su17, Su18, and Su19 that selectively connect a T-phase line of the power source 2 and each of the U-phase line, the V-phase line, and the R-phase line of the AC motor 3 based on the control of the controller 6a.

The controller 6a generates a switch driving signal so as to output a voltage corresponding to the desired-voltage instruction to the AC motor 3 by the known PWM control method of a matrix converter and outputs the signal to the power conversion circuit 5a thus allowing the power conversion circuit 5a to perform a power conversion operation.

Here, the three power modules MD4, MD5, and MD6 are identical with each other with respect to the constitution. Accordingly, hereinafter, the power module MD4 is explained, and the explanations of the power modules MD5 and MD6 are omitted.

As illustrated in FIG. 14, each of the three switch units Su11, SU12, and Su13 included in the power module MD4 includes a bidirectional switch, which is identical with that illustrated in FIG. 2, constituted of two unidirectional switching elements Q1 and Q2 and two diodes D1 and D2.

Furthermore, each of the three switch units Su11, Su12, and Su13 includes a diode D5 (first diode) and a diode D4 (second diode) that are identical with the diodes D4 and D5 included in the switch unit Su2 illustrated in FIG. 2. In addition, any one of the three switch units Su11, Su12, and Su13 (switch unit Su12 in this case) includes a diode D3 (third diode) identical with the diode D3 included in the switch units Su1, Su2, and Su3.

In the power module MD4, for example, when a current flows from a U3-phase line to an R3-phase line, the current flows through a first passage. Thereafter, when the unidirectional switching element Q1 of the switch unit Su11 is turned off, the current having flowed immediately before the unidirectional switching element Q1 is turned off is maintained by flowing through a second passage and output to an input terminal R3 via the diode D3 included in the switch unit Su12.

Furthermore, in a state that a current flows from a V3-phase line to the R3-phase line, or in a state that the current flows from a W3-phase line to the R3-phase line, when the unidirectional switching element Q1 that flows the current is turned off, the current is also output to the input terminal R3 via the diode D3.

That is, in the power module MD4, the diode D3 of the switch unit Su12 is shared as a diode for a snubber circuit that outputs a current input from a capacitor C1 to the input terminal R3 by the switch units Su11, Su12, and Su13.

In this manner, the matrix converter according to the second embodiment includes a plurality of input terminals and a plurality of output terminals. In addition, the matrix converter includes a power conversion circuit in which each of the bidirectional switch constituted of serially connected antiparallel connection circuits each constituted of a unidirectional switching element and a diode is arranged between each input terminal and each output terminal, and a snubber circuit connected to the bidirectional switch.

The snubber circuit includes the first diode whose one end is connected to the point of connection between the two unidirectional switching elements constituting the bidirectional switch, and a capacitor (a capacitor constituted of a plurality of capacitors are connected to each other in parallel is also applicable) whose one end is connected to the other end of the first diode. In addition, the snubber circuit includes the third diode whose one end is connected to the other end of the capacitor and other end is connected to the input terminal.

In the snubber circuit, the other end of the corresponding third diode is connected to only a part of (the input-terminal sides of) the bidirectional switches. The bidirectional switches connected between one of the input terminals and each of the output terminals, and the first diodes connected to the respective bidirectional switches are arranged in one power module. The power module is provided to the corresponding input terminal.

Furthermore, in the power module, the third diode connected to only a part of the bidirectional switches is arranged. According to the second embodiment, the downsizing and cost reduction of the matrix converter can be achieved by the optimization of the snubber circuit.

Here, the power module MD4 illustrated in FIG. 14 is one example, and various modifications are conceivable. For example, it may be possible to adopt the constitution in which a second diode whose one end is connected to the other end of the capacitor and other end is connected to the corresponding output terminal is provided outside the power module, and the other end of the second diode is connected to only a part of the output terminals of the power modules.

In this manner, for example, in the matrix converter including three power modules each having the identical constitution with the power module MD4 illustrated in FIG. 14, nine diodes D4 required for the power module is reduced into three diodes thus optimizing the snubber circuit.

Furthermore, a first conductor L1 and a second conductor L2 identical with those in the case of the switch unit Su1b illustrated in FIG. 9 may be provided to each of the switch units Su11, Su12, and Su13 and the anode of the first diode D5 may be connected to the first conductor L1. In this manner, in the same manner as the case of the first embodiment, the occurrence of a surge voltage can be suppressed.

Furthermore, a third conductor L3 identical with that in the case of the switch unit Su1c illustrated in FIG. 11 may be provided to each of the switch units Su11, Su12, and Su13 illustrated in FIG. 14 and the separate first diodes D51 and D52 may be connected to both ends of the third conductor L3. In this manner, the occurrence of the surge voltage can also be suppressed.

Figure 15:
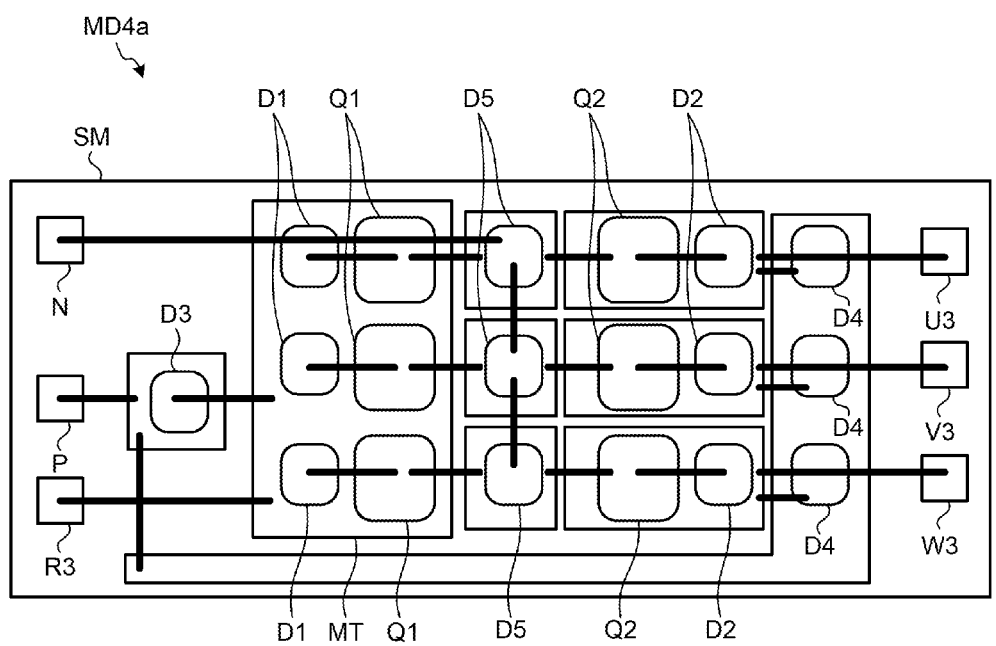
FIG. 15 is an explanatory view illustrating a power module according to a first modification of the second embodiment as viewed in a top view.

In the second embodiment, the bidirectional switch in each of the switch units Su11, Su12, and Su13 may also be a bidirectional switch constituted of the two unidirectional switching elements Q1 and Q2 whose emitters are connected to each other. In this case, for example, a power module MD4a is constituted as illustrated in FIG. 15. FIG. 15 is an explanatory view illustrating the power module MD4a according to a modification 1 of the second embodiment as viewed in a plan view.

To be more specific, for example, in the power module MD4a, each of three unidirectional switching elements Q1 connected to an input terminal R3 is constituted of an IGBT or a SiC transistor. As illustrated in FIG. 15, collectors each provided to the bottom surface of each of the unidirectional switching elements Q1 are brought into contact with and connected to the top surface of a planar-shaped conductor MT directly or by way of a heat spreader.

In this manner, an inductance can be lowered between the input terminal R3 and the collector of each of the unidirectional switching elements Q1. Hence, when the unidirectional switching element Q1 that flows a current is turned off, the occurrence of the surge voltage can be suppressed.

Here, each of the present embodiments is explained by taking the matrix converter that converts a three-phase AC input voltage into a three-phase AC output voltage as an example. However, the snubber circuit described in each of the embodiments can also be applied to a matrix converter that converts the three-phase AC input voltage into a single-phase AC output voltage.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A matrix converter comprising:
a plurality of input terminals;
a plurality of output terminals;
a power conversion circuit including bidirectional switches, each of the bidirectional switches including antiparallel connection circuits that are serially connected to each other, each of the antiparallel connection circuits including a unidirectional switching element and a diode, and the bidirectional switches being arranged between the input terminals and the corresponding output terminal; and
a snubber circuit connected to the bidirectional switches, the snubber circuit comprising:
a plurality of first diodes that respectively correspond to the bidirectional switches, a first connecting point of each of the first diodes being connected to a point of connection between the two unidirectional switching elements constituting the bidirectional switch;
a capacitor whose first connecting point is connected to a second connecting point of each of the first diodes;
a second diode whose first connecting point is connected to a second connecting point of the capacitor and second connecting point is connected to the corresponding output terminal; and
a plurality of third diodes that respectively correspond to the bidirectional switches, a first connecting point of each of the third diodes being connected to the second connecting point of the capacitor, a second connecting point of each of the third diodes being connected to the corresponding input terminal, wherein
the bidirectional switches connected between at least one of the output terminals and each of the input terminals, the first diodes connected to the respective bidirectional switches, and the second diode are arranged in one power module, and the power module is provided for the corresponding output terminal.

2. The matrix converter according to claim 1, wherein each of the third diodes has the first connecting point connected to the second connecting point of the capacitor and the second connecting point connected to the corresponding input terminal, and
the bidirectional switches connected between at least one of the output terminals and each of the input terminals, the first diodes connected to the respective bidirectional switches, and the second diode are arranged in one power module, the third diodes are arranged outside the power module, and the power module is provided for the corresponding output terminal.

3. The matrix converter according to claim 1, wherein
each of the unidirectional switching elements is an insulated gate bipolar transistor (IGBT) or a silicon carbide (SiC) transistor,
the bidirectional switches connect emitters of the unidirectional switching elements to each other at the point of connection, and
collectors of the unidirectional switching elements connected to the corresponding output terminal in common in the power module are connected by a common planar-shaped conductor on a side opposite to a side on which the emitters are connected to each other.

4. The matrix converter according to claim 1, wherein
the bidirectional switches connect the collectors of the unidirectional switching elements to each other at the point of connection, and
each of the first diodes has an anode connected to the point of connection and a cathode connected to the capacitor.

5. The matrix converter according to claim 1, wherein
the bidirectional switches connect the emitters of the unidirectional switching elements to each other at the point of connection, and
each of the first diodes has a cathode connected to the point of connection and an anode connected to the capacitor.

6. The matrix converter according to claim 1, wherein each of the bidirectional switches has a first conductor constituted of the two unidirectional switching elements connected to each other in series and a second conductor constituted of the unidirectional switching element and the diode that are connected to each other in series, and the first conductor is connected to the corresponding first diode.

7. The matrix converter according to claim 1, wherein each of the bidirectional switches is constituted by connecting the separate first diodes to both ends of a third conductor that connects anti-parallel connection circuits each constituted of the unidirectional switching element and the diode to each other in series.

8. A matrix converter comprising:
a plurality of input terminals;
a plurality of output terminals;
a power conversion circuit including bidirectional switches, each of the bidirectional switches including antiparallel connection circuits that are serially connected to each other, each of the antiparallel connection circuits including a unidirectional switching element and a diode, and the bidirectional switches being arranged between the corresponding input terminal and the output terminals; and
a snubber circuit connected to the bidirectional switches;
the snubber circuit comprising:
a plurality of first diodes that respectively correspond to the bidirectional switches, a first connecting point of each of the first diodes being connected to a point of connection between the two unidirectional switching elements constituting the bidirectional switch;
a capacitor whose first connecting point is connected to a second connecting point of each of the first diodes;
a plurality of second diodes that respectively correspond to the bidirectional switches, a first connecting point of each of the second diodes being connected to a second connecting point of the capacitor, a second connecting point of each of the second diodes being connected to the corresponding output terminal; and
a third diode whose first connecting point is connected to the second connecting point of the capacitor and second connecting point is connected to the corresponding input terminal, wherein
the bidirectional switches connected between at least one of the input terminals and each of the output terminals, the first diodes connected to the respective bidirectional switches, and the third diode are arranged in one power module, and the power module is provided for the corresponding input terminal.

9. The matrix converter according to claim 8, wherein each of the second diodes has the first connecting point connected to the second connecting point of the capacitor and the second connecting point connected to the corresponding output terminal, and
the bidirectional switches connected between at least one of the input terminals and each of the output terminals, the first diodes connected to the respective bidirectional switches, and the third diode are arranged in one power module, the second diodes are arranged outside the power module, and the power module is provided for the corresponding input terminal.

10. The matrix converter according to claim 8, wherein
each of the unidirectional switching element is an insulated gate bipolar transistor (IGBT) or a silicon carbide (SiC) transistor,
the bidirectional switches connect emitters of the unidirectional switching elements to each other at the point of connection, and
collectors of the unidirectional switching elements connected to the corresponding input terminal in common in the power module are connected by a common planar-shaped conductor on a side opposite to a side on which the emitters are connected to each other.

11. The matrix converter according to claim 8, wherein
the bidirectional switches connect the collectors of the unidirectional switching elements to each other at the point of connection, and
each of the first diodes has an anode connected to the point of connection and a cathode connected to the capacitor.

12. The matrix converter according to claim 8, wherein
the bidirectional switches connect the emitters of the unidirectional switching elements to each other at the point of connection, and
each of the first diodes has a cathode connected to the point of connection and an anode connected to the capacitor.

13. The matrix converter according to claim 8, wherein each of the bidirectional switches has a first conductor constituted of the two unidirectional switching elements connected to each other in series and a second conductor constituted of the unidirectional switching element and the diode that are connected to each other in series, and the first conductor is connected to the corresponding first diode.

14. The matrix converter according to claim 8, wherein each of the bidirectional switches is constituted by connecting the separate first diodes to both ends of a third conductor that connects antiparallel connection circuits each constituted of the unidirectional switching element and the diode to each other in series.

* * * * *